(12) United States Patent
Guthery

(10) Patent No.: US 8,474,026 B2
(45) Date of Patent: Jun. 25, 2013

(54) REALIZATION OF ACCESS CONTROL CONDITIONS AS BOOLEAN EXPRESSIONS IN CREDENTIAL AUTHENTICATIONS

(75) Inventor: Scott B. Guthery, Chestnut Hill, MA (US)

(73) Assignee: Assa Abloy AB (SE)

( * ) Notice: Subject to any disclaimer, the term of this patent is extended or adjusted under 35 U.S.C. 154(b) by 563 days.

(21) Appl. No.: 12/724,071

(22) Filed: Mar. 15, 2010

(65) Prior Publication Data

US 2010/0235905 A1    Sep. 16, 2010

Related U.S. Application Data

(60) Provisional application No. 61/160,194, filed on Mar. 13, 2009.

(51) Int. Cl.
*H04L 29/06* (2006.01)

(52) U.S. Cl.
USPC ............... 726/7; 713/159; 713/170; 713/172; 713/185

(58) Field of Classification Search
USPC .............................................. 726/7
See application file for complete search history.

(56) References Cited

U.S. PATENT DOCUMENTS

| | | | |
|---|---|---|---|
| 3,920,896 A | 11/1975 | Bishop et al. | |
| 3,958,088 A | 5/1976 | Vieri | |
| 4,703,503 A | 10/1987 | Asai | |
| 5,146,499 A | 9/1992 | Geffrotin | |
| 5,377,997 A | 1/1995 | Wilden et al. | |
| 5,438,650 A | 8/1995 | Motoyama et al. | |
| 5,572,195 A | 11/1996 | Heller et al. | |
| 5,651,006 A | 7/1997 | Fujino et al. | |
| 5,657,388 A | 8/1997 | Weiss | |
| 5,758,083 A | 5/1998 | Singh et al. | |
| 5,822,435 A | 10/1998 | Boebert et al. | |
| 5,828,830 A | 10/1998 | Rangaraian et al. | |
| 5,987,513 A | 11/1999 | Prithviraj et al. | |
| 6,088,450 A | 7/2000 | Davis et al. | |
| 6,219,718 B1 | 4/2001 | Villalpando | |

(Continued)

FOREIGN PATENT DOCUMENTS

| | | |
|---|---|---|
| EP | 0668579 | 8/1995 |
| EP | 1724684 | 5/2005 |

(Continued)

OTHER PUBLICATIONS

Zhang et al., Plugging a scalable authentication framework into Shibboleth, Jun. 2005, 14th IEEE International Workshops on Enabling Technologies: Infrastructure for Collaborative Enterprise, pp. 271-276.*

(Continued)

*Primary Examiner* — Taghi Arani
*Assistant Examiner* — Kenneth Chang
(74) *Attorney, Agent, or Firm* — Sheridan Ross P.C.

(57) ABSTRACT

A method, reader, and system are provided for performing group authentication processes. In particular, a group access decision can be made upon the analysis of a group rule. The group rule may contain a Boolean expression including one or more Boolean conditions. If an appropriate group of credentials are presented to a reader such that the Boolean expression is satisfied, then the group of credentials and the holders thereof are allowed access to a protected asset.

15 Claims, 5 Drawing Sheets

U.S. PATENT DOCUMENTS

| | | | |
|---|---|---|---|
| 6,272,542 B1 | 8/2001 | Barnes et al. | |
| 6,356,949 B1 | 3/2002 | Katsandres et al. | |
| 6,360,258 B1 | 3/2002 | LeBlanc | |
| 6,367,011 B1 | 4/2002 | Lee et al. | |
| 6,484,225 B2 | 11/2002 | Sheikh et al. | |
| 6,490,680 B1 | 12/2002 | Scheidt et al. | |
| 6,516,357 B1 | 2/2003 | Hamann et al. | |
| 6,601,200 B1 | 7/2003 | Delp et al. | |
| 6,616,535 B1 | 9/2003 | Nishizaki et al. | |
| 6,675,351 B1 | 1/2004 | Leduc | |
| 6,757,280 B1 | 6/2004 | Wilson, Jr. | |
| 6,823,453 B1 | 11/2004 | Hagerman | |
| 6,857,566 B2 | 2/2005 | Wankmueller | |
| 6,880,752 B2 | 4/2005 | Tarnovsky et al. | |
| 6,959,394 B1 | 10/2005 | Brickell et al. | |
| 6,986,139 B1 | 1/2006 | Kubo | |
| 6,990,588 B1 * | 1/2006 | Yasukura | 713/186 |
| 7,036,146 B1 | 4/2006 | Goldsmith | |
| 7,070,091 B2 | 7/2006 | Hepworth et al. | |
| 7,092,915 B2 | 8/2006 | Best et al. | |
| 7,096,282 B1 | 8/2006 | Wille | |
| 7,171,654 B2 | 1/2007 | Werme et al. | |
| 7,194,628 B1 | 3/2007 | Guthery | |
| 7,242,694 B2 | 7/2007 | Beser | |
| 7,270,266 B2 | 9/2007 | Silverbrook et al. | |
| 7,287,695 B2 | 10/2007 | Wankmueller | |
| 7,321,566 B2 | 1/2008 | Fu | |
| 7,363,489 B2 | 4/2008 | Burakoff et al. | |
| 7,406,592 B1 | 7/2008 | Polyudov | |
| 7,500,606 B2 | 3/2009 | Park et al. | |
| 7,506,041 B1 | 3/2009 | Shelton et al. | |
| 7,620,041 B2 | 11/2009 | Dunn et al. | |
| 7,669,212 B2 | 2/2010 | Alao et al. | |
| 7,716,355 B2 | 5/2010 | McCloghrie et al. | |
| 7,725,784 B2 | 5/2010 | Laouamri et al. | |
| 7,742,183 B2 | 6/2010 | Sato | |
| 7,788,403 B2 | 8/2010 | Darugar et al. | |
| 7,853,643 B1 | 12/2010 | Martinez et al. | |
| 7,908,608 B2 | 3/2011 | Ozor et al. | |
| 8,074,271 B2 | 12/2011 | Davis et al. | |
| 2002/0138582 A1 | 9/2002 | Chandra et al. | |
| 2002/0199096 A1 | 12/2002 | Wenocur et al. | |
| 2003/0115466 A1 | 6/2003 | Aull et al. | |
| 2003/0131051 A1 | 7/2003 | Lection et al. | |
| 2003/0159056 A1 | 8/2003 | Cromer et al. | |
| 2004/0040026 A1 | 2/2004 | Farrugia | |
| 2004/0059925 A1 | 3/2004 | Benhammou et al. | |
| 2004/0073727 A1 | 4/2004 | Moran et al. | |
| 2004/0083378 A1 | 4/2004 | LeRose | |
| 2004/0104266 A1 * | 6/2004 | Bolle et al. | 235/382 |
| 2004/0151322 A1 | 8/2004 | Sovio et al. | |
| 2004/0158625 A1 | 8/2004 | Neale | |
| 2004/0204778 A1 | 10/2004 | Lalapeth et al. | |
| 2004/0250087 A1 | 12/2004 | Ray et al. | |
| 2005/0005063 A1 | 1/2005 | Liu et al. | |
| 2005/0005131 A1 | 1/2005 | Yoshida et al. | |
| 2005/0033703 A1 | 2/2005 | Holdsworth | |
| 2005/0105508 A1 | 5/2005 | Saha | |
| 2005/0109841 A1 | 5/2005 | Ryan et al. | |
| 2005/0193213 A1 | 9/2005 | Johnson et al. | |
| 2005/0228993 A1 | 10/2005 | Silvester et al. | |
| 2005/0242921 A1 * | 11/2005 | Zimmerman et al. | 340/5.2 |
| 2005/0262229 A1 | 11/2005 | Gattu et al. | |
| 2006/0022799 A1 * | 2/2006 | Juels | 340/10.1 |
| 2006/0023674 A1 | 2/2006 | Goring et al. | |
| 2006/0053210 A1 | 3/2006 | Dague et al. | |
| 2006/0059253 A1 | 3/2006 | Goodman et al. | |
| 2006/0095957 A1 | 5/2006 | Lundblade et al. | |
| 2006/0132304 A1 * | 6/2006 | Cabell | 340/539.23 |
| 2006/0174130 A1 * | 8/2006 | Noble | 713/182 |
| 2006/0195594 A1 | 8/2006 | Fujimori et al. | |
| 2006/0208066 A1 | 9/2006 | Finn et al. | |
| 2006/0226950 A1 | 10/2006 | Kanou et al. | |
| 2006/0230437 A1 | 10/2006 | Boyer et al. | |
| 2006/0259961 A1 | 11/2006 | Joffray | |
| 2007/0057057 A1 | 3/2007 | Andresky et al. | |
| 2007/0064623 A1 | 3/2007 | Brahmaroutu | |
| 2007/0067642 A1 | 3/2007 | Singhal | |
| 2007/0067833 A1 | 3/2007 | Colnot | |
| 2007/0169183 A1 | 7/2007 | Kipnis et al. | |
| 2007/0174907 A1 | 7/2007 | Davis | |
| 2007/0180086 A1 | 8/2007 | Fang et al. | |
| 2007/0186106 A1 * | 8/2007 | Ting et al. | 713/168 |
| 2007/0209040 A1 | 9/2007 | Alstad | |
| 2007/0214369 A1 | 9/2007 | Roberts et al. | |
| 2007/0217425 A1 | 9/2007 | Mclaise et al. | |
| 2007/0249323 A1 | 10/2007 | Lee et al. | |
| 2007/0250915 A1 * | 10/2007 | Thibadeau | 726/5 |
| 2007/0276935 A1 | 11/2007 | Liu | |
| 2007/0278291 A1 | 12/2007 | Rans et al. | |
| 2007/0282951 A1 | 12/2007 | Selimis et al. | |
| 2007/0283145 A1 | 12/2007 | Gressel et al. | |
| 2008/0010674 A1 * | 1/2008 | Lee | 726/7 |
| 2008/0016370 A1 | 1/2008 | Libin et al. | |
| 2008/0095339 A1 | 4/2008 | Elliott et al. | |
| 2008/0133391 A1 | 6/2008 | Kurian et al. | |
| 2008/0163361 A1 * | 7/2008 | Davis et al. | 726/19 |
| 2008/0204429 A1 | 8/2008 | Silverbrook et al. | |
| 2008/0257952 A1 | 10/2008 | Zandonadi | |
| 2009/0013190 A1 | 1/2009 | Benhammou et al. | |
| 2009/0028118 A1 | 1/2009 | Gray | |
| 2009/0115573 A1 * | 5/2009 | Naressi et al. | 340/10.1 |
| 2009/0157700 A1 | 6/2009 | Van Vugt | |
| 2010/0077091 A1 | 3/2010 | Sarkar et al. | |
| 2011/0264926 A1 | 10/2011 | Guthery | |

FOREIGN PATENT DOCUMENTS

| | | |
|---|---|---|
| EP | 1705941 | 9/2006 |
| EP | 1895445 | 3/2008 |
| GB | 2358500 | 7/2001 |
| WO | WO 98/52136 | 11/1998 |
| WO | WO 2005/078465 | 8/2005 |
| WO | WO 2006/013162 | 2/2006 |

OTHER PUBLICATIONS

Extended European Search Report for European Application No. 10156465.6, dated May 28, 2010.

"RFC 1661: The Point-to-Point Protocol (PPP)," Network Working Group (W. Simpson, ed.), Jul. 1994, pp. 1-52.

"RFC 707: A High-Level Framework for Network-Based Resource Sharing," Network Working Group, Jan. 1976, pp. 1-28.

Aboba, B. et al., "RFC 3748, Extensible Authentication Protocol," Network Working Group (H. Levkowetz, ed.), Jun. 2004, pp. 1-67.

Arkko, J. et al., "RFC 4187: Extensible Authentication Protocol Method for 3rd Generation Authentication and Key Agreement (EAP—AKA)," Network Working Group, Jan. 2006, pp. 1-79.

Benaloh, J. et al., "Generalized Secret Sharing and Monotone Functions," Advances in Cryptology—CRYPTO '88, Santa Barbara, CA (S. Goldwasser ed., Aug. 1988); Lecture Notes in Computer Science, vol. 403 (G. Goos and J. Hartmanis, eds. 1990), pp. 27-35.

Blumenthal, U. et al., "RFC 3826: The Advanced Encryption Standard (AES) Cipher Algorithm in the SNMP User-based Security Model," Network Working Group, Dec. 2002, pp. 1-16.

Blumenthal, U. et al., "Standard 62—RFC 3414: User-based Security Model (USM) for Version 3 of the Simple Network Management Protocol (SNMPv3)," Network Working Group, Dec. 2002, available at www.ietf.org/rfc/rfc3414.txt, pp. 1-88.

Bormann, C. et al., "RFC 3095: RObust Header Compression (ROHC): Framework and Four Profiles: RTP, UDP, ESP, and Uncompressed," Network Working Group, Jul. 2001, available at www.ietf.org/rfc/rfc3095.txt, pp. 1-168.

Case, J. et al., "Standard 62—RFC 3412: Message Processing and Dispatching for the Simple Network Management Protocol (SNMP)," Network Working Group, Dec. 2002, available at www.ietf.org/rfc/rfc3412.txt, pp. 1-43.

Casner, S. et al., "RFC 2508: Compressing IP/UDP/RTP Headers for Low-Speed Serial Links," Network Working Group, Feb. 1999, pp. 1-24.

Chiu, A., "RFC 2695: Authentication Mechanisms for ONC RPC," Network Working Group, Sep. 1999, pp. 1-18.

Degermark, M., ed., "RFC 3096: Requirements for Robust IP/UDP/RTP Header Compression," Network Working Group, Jul. 2001, pp. 1-8.

Eisler, M., ed., "RFC 4506: XDR: External Data Representation Standard," replaced RFC 1832, Network Working Group, May 2006, pp. 1-27.

Finking, R. et al., "RFC 4997: Formal Notation for RObust Header Compression (ROHC-FN)," Network Working Group, Jul. 2007, pp. 1-62.

Geer, D.E. et al., "Threshold Cryptography for the Masses," Sixth International Financial Cryptography Conference, Southampton, Bermuda, Mar. 2002, Revised Papers, Lecture Notes in Computer Science, vol. 2357 (2003), pp. 220-237.

Guthery, S. et al., "IP and ARP over ISO 7816," Internet Draft, Network Working Group, Jan. 2001, pp. 1-8.

Guthery, S. et al., "IP/TCP/UDP Header Compression for ISO 7816 Links," Internet Draft, Network Working Group, Jan. 2001, pp. 1-8.

Guthery, S., "EchoNets, E-memes, and Extended Realities," Dr. Dobb's Journal, Apr. 1, 1994, pp. 72-84, also available at http://www.drdobbs.com/architect/184409220.

Guthery, S., "Wireless Relay Networks," IEEE Network, vol. 11, No. 6, Nov.-Dec. 1997, pp. 46-51.

Guthery, S.B., "Group Authentication Using the Naccache-Stern Public-Key Cryptosystem", arXiv.org > cs > arXiv:cs/0307059 (2003), 7 pages.

Harrington, D. et al., "Secure Shell Transport Model for SNMP," Internet Draft, Network Working Group, Oct. 11, 2006, pp. 1-37.

Harrington, D. et al., "Standard 62—RFC 3411: An Architecture for Describing Simple Network Management Protocol (SNMP) Management Frameworks," Network Working Group, Dec. 2002, available at www.ietf.org/rfc/rfc3411.txt, pp. 1-64.

Harrington, D. et al., "Transport Subsystem for the Simple Network Management Protocol (SNMP)," Internet Draft, Network Working Group, Dec. 13, 2006, pp. 1-34.

Harrington, D., "Transport Security Model for SNMP," Internet Draft, Network Working Group, Oct. 11, 2006, pp. 1-34.

Housley, R. et al. "RFC 4334: Certificate Extensions and Attributes Supporting Authentication in Point-to-Point Protocol (PPP) and Wireless Local Area Networks (WLAN)," Network Working Group, Feb. 2006, pp. 1-11.

Jonsson, L-E. et al., RFC 4815: RObust Header Compression (ROHC): Corrections and Clarifications to RFC 3095, Network Working Group, Feb. 2007, pp. 1-33.

Jonsson, L-E. et al., "RFC 4995: The Robust Header Compression (ROHC) Framework," Network Working Group, Jul. 2007, pp. 1-40.

Jonsson, L-E., "RFC 3759: RObust Header Compression (ROHC): Terminology and Channel Mapping Examples," Network Working Group, Apr. 2004, pp. 1-20.

Koren, T. et al., "RFC 3544: IP Header Compression over PPP," Network Working Group, Jul. 2003, pp. 1-14.

Larzon, L-A. et al. "RFC 3828: The Lightweight User Datagram Protocol (UDP-Lite)," Network Working Group, Sep. 2006, pp. 1-12.

Leach, P. et al., "RFC 4122: A Universally Unique IDentifier (UUID) URN Namespace," Network Working Group, Jul. 2005, pp. 1-32.

Levi, D. et al., "Standard 62—RFC 3413: Simple Network Management Protocol (SNMP) Application," Network Working Group, Dec. 2002, available at www.ietf.org/rfc/rfc3413.txt, pp. 1-74.

McCloghrie, K. et al., eds., "RFC 2579: Textual Conventions for SMIv2," Network Working Group, Apr. 1999, pp. 1-26.

McCloghrie, K. et al., eds., "RFC 2580: Conformance Statements for SMIv2," Network Working Group, Apr. 1999, pp. 1-29.

McCloghrie, K., ed., "Standard 58—RFC 2578: Structure of Management Information Version 2 (SMIv2)," Network Working Group, Apr. 1999, pp. 1-43.

Naccache et al., "A New Public-Key Cryptosystem," published in W. Fumy, Ed., Advances in Cryptology—EUROCRYPT '97, vol. 1233 of Lecture Notes in Computer Science, pp. 27-36, Springer-Verlag, 1997.

Neuman, C. et al., "RFC 4120: The Kerberos Network Authentication Service (V5)," Network Working Group, Jul. 2005, pp. 1-138.

Pelletier, G., "RFC 4019: RObust Header Compression (ROHC): Profiles for User Datagram Protocol (UDP) Lite," Network Working Group, Apr. 2005, pp. 1-23.

Prafullchandra, H., "RFC 2875: Diffie-Hellman Proof-of-Possession Algorithms," Network Working Group, Jul. 2000, pp. 1-23.

Presuhn, R., ed., "Standard 62—RFC 3416: Version 2 of the Protocol Operations for the Simple Network Management Protocol (SNMP)," Network Working Group, Dec. 2002, pp. 1-31.

Presuhn, R., ed., "Standard 62—RFC 3417: Transport Mappings for the Simple Network Management Protocol (SNMP)," Network Working Group, Dec. 2002, pp. 1-19.

Presuhn, R., ed., Standard 62—RFC 3418: Management Information Base (MIB) for the Simple Network Management Protocol (SNMP), Network Working Group, Dec. 2002, pp. 1-26.

Rescorla, E., "RFC 2631: Diffie-Hellman Key Agreement Method," Network Working Group, Jun. 1999, pp. 1-13.

Shamir, "How to Share a Secret," Communications for the ACM, Nov. 1979, pp. 612-613.

Simpson, W., "RFC 1994: PPP Challenge Handshake Authentication Protocol (CHAP)," Network Working Group, Aug. 1996, pp. 1-12.

Simpson, W., ed., "RFC 1662: PPP in HDLC-like Framing," Network Working Group, Jul. 1994, pp. 1-25.

Srinivasan, R. et al., "RFC 1831: RPC: Remote Procedure Call Protocol Specification Version 2," Network Working Group, Aug. 1995, pp. 1-18.

Vanderveen, M. et al., RFC 4763: Extensible Authentication Protocol Method for Shared-secret Authentication and Key Establishment (EAP—SAKE), Network Working Group, Nov. 2006, pp. 1-46.

Vollbrecht, J. et al., "RFC 4137: State Machines for Extensible Authentication Protocol (EAP) Peer and Authenticator," Network Working Group, Aug. 2005, pp. 1-51.

Wijnen, B. et al., "Standard 62—RFC 3415: View-based Access Control Model (VACM) for the Simple Network Management Protocol (SNMP)," Network Working Group, Dec. 2002, available at www.ietf.org/rfc/rfc3415.txt, pp. 1-39.

ISO/IEC 8825-1, "Information technology—ASN.1 encoding rules: Specification of Basic Encoding Rules (BER), Canonical Encoding Rules (CER) and Distinguished Encoding Rules (DER)," 2008.

Wieringa, R. et al., "The identification of objects and roles," Technical Report IR-267, Faculty of Mathematics and Computer Science, Vrije Universiteit, Amsterdam, 1991, pp. 1-15.

* cited by examiner

REALIZATION OF ACCESS CONTROL CONDITIONS AS BOOLEAN EXPRESSIONS IN CREDENTIAL AUTHENTICATIONS

CROSS-REFERENCE TO RELATED APPLICATIONS

This Application claims the benefit of U.S. Provisional Application No. 61/160,194, filed Mar. 13, 2009, the entire disclosure of which is hereby incorporated herein by reference.

FIELD OF THE INVENTION

The present invention relates generally to authentication techniques and in particular to group authentication techniques.

BACKGROUND

Real-life situations exist wherein the successful authentication of more than one entity must be performed before an activity is authorized. The classic example is the safe deposit box which requires that both the individual renting the box and the bank must present their key in order to open the box. The requirement that two different keys are needed to launch a missile carrying a nuclear warhead is a less prosaic example. In both situations, two physical keys that turn a pin and tumbler system are required to be presented simultaneously.

In all of the above cases in the current art and other existing access control systems that require multiple authentications, the Boolean expression that must be satisfied to gain access is "baked" into the system. The result is that it is very difficult if not impossible to change the Boolean expression in authentications that must be satisfied to gain access.

For example, if a bank customer says "I don't like the usual rule for safe deposit box access. I want there to be two representatives of my family and two representatives of the bank in order to open the box. Furthermore, one of the family representatives has to be a female and one of the bank representatives has to be a vice president." Perhaps the bank could work something out procedurally in the case of one or two very desirable customers but it is unlikely that they would offer a safe deposit feature to all their customers that said "You Pick the Access Condition."

A first disadvantage of the current art is that it is impractical to implement access control rules that are arbitrary Boolean expressions in authentications.

A second disadvantage of the current art is exemplified by the need to have all the keys (and usually all the people) necessary to open the box physically present in the vault at the time of opening. This is only true of course if the Boolean expression contains AND or NOT. In the hotel room scenario wherein there is only the OR operator is used in the Boolean expression only the room attendant or the hotel guest need be present.

A third disadvantage of the current art is that when a key holder inserts their key into a lock and turns it, it is obvious to everybody present that the key holder has or has not been successfully authenticated. In the former case the key turns and in the latter case the key does not turn. This is disadvantageous because an onlooker can physically observe conditions that result in the satisfaction of the Boolean expression. Once this is determined, the onlooker only needs to steal the keys of the necessary parties to gain access to a protected asset.

A fourth disadvantage of the current art is that in many cases the details of the Boolean expression that must be satisfied to gain access is also known to all the participants and perhaps to the general public. Thus, for example, the bank publishes the fact that two keys are necessary to open its safe deposit boxes, that one of these keys is held by the bank and the other is held by the box holder.

A fifth disadvantage of the current art is that it is very difficult if not impossible to implement a NOT condition. For example, one might want to implement the hotel room access condition (Key-of-Room-Attendant OR Key-of-Hotel-Guest)
AND NOT (Key-of-Room-Attendant AND Key-of-Hotel-Guest)

in order to prohibit (for whatever reason) the hotel guest and the room attendant from being in the room at the same time.

Most commercial access control systems in the current art do not support this group behavior. In these systems a single identification card is presented to a system reader and if the card is successfully authenticated by the system access is allowed. Accordingly, there exists a need to develop a commercially viable access control system that facilitates group authentication decisions.

SUMMARY

It is, therefore, one aspect of the present invention to provide a system whereby a plurality of digital credentials are presented to a reader, either simultaneously or sequentially. The reader and/or credentials are configured in such a manner that a specific but arbitrary Boolean expression needs to be satisfied before access is authorized. The Boolean expression is not necessarily dependent upon any one of the credentials being permitted single access to an asset, but instead depends upon a group condition being satisfied. In other words, before access is authorized, the Boolean expression is required to evaluate as TRUE.

As one example, two different keys are needed to open a safe deposit box. One key is held by the bank and the other key is held by the bank customer renting the safe deposit box. The Boolean access condition for the safe deposit box can be stated simply as:

Key-of-Bank AND Key-of-Box-Holder

As another example, a hotel gives a key to each customer that will only open door to the room they have been assigned but the hotel gives a key to the room attendants that will open all the room doors in the hotel. The access condition for the rooms in the hotel may be stated simply as:

Key-of-Room-Attendant OR Key-of-Hotel-Guest

In both cases, the access condition is a logical combination of individual authentications, the bank AND the box holder in the first case and the maid OR the hotel guest in the second.

The access to the safe deposit box and the hotel room are examples of Boolean authentication. Rather than just authenticating a single individual, for example, acquiring a PIN at an ATM machine, in Boolean authentication more than one individual is authenticated.

In the single authentication case access is granted on the single condition that the single authentication is successful (e.g., The PIN entered is the correct PIN).

In Boolean authentication, access is granted if the collection of authentications satisfy a Boolean (logical) expression (e.g., The bank key presented turns in the bank key tumbler assembly AND the customer key presented turns in the customer key tumbler assembly).

Voting is another context that makes use of a Boolean combination of individual authentications. If A, B and C are the individuals voting on an issue, then the issue passes if the votes in its favor satisfy the following logical expression:

(A AND B) OR (A AND C) OR (B AND C) OR (A AND B AND C)

In this case the voters authenticate themselves; they vote "Yes" to indicate a successful authentication and they vote "No" to indicate a failed authentication.

The current disclosure provides efficient and easily implemented mechanisms whereby digital credentials and the access control systems making use of these credentials can be configured in such a manner that a specific but arbitrary Boolean expression needs to be satisfied (i.e., evaluate to TRUE) before access is authorized.

In accordance with at least one embodiment of the present invention, an access control system is provided that includes a plurality of credentials carrying only part of an authentication, rather than information sufficient to complete an individual authentication. The part of the authentication carried by any one credential is the contribution of that credential to the many-part Boolean expression that must be satisfied to gain access to a protected asset.

As an example, U.S. Pat. No. 7,194,628 to Guthery, the entire contents of which are hereby incorporated herein by reference, teaches how to use the public key cryptography system invented by Naache and Stern to build software locks and keys that support access conditions that are arbitrary Boolean combinations of authentications. In particular, the '628 patent describes mechanisms for implementing and successfully enforcing a Boolean expression having a NOT condition.

Embodiments of the present invention leverage the teachings of the '628 patent to create an access control system having portable authentication credentials, in the form of contact-based and/or contactless credentials, that can be used in group authentication schemes. The group authentication decision can be made after all credentials have been presented to the reader or after only a subset of the credentials have been presented. Moreover, the group authentication decision can be made on the reader or on the card. The decision of when and where to make such authentication decisions may depend upon the Boolean conditions contained within the Boolean expression. In particular, if the Boolean expression contains a NOT or XOR condition, then the reader may enforce an additional rule that requires all credentials within a group to be read before a group authentication decision is made. As another example, if the Boolean expression does not contain a NOT condition, then the reader may allow a group authentication decision to be made after only a subset of credentials within a group have been read. Moreover, the decision responsibilities can be transferred to the credentials if there is not a NOT or XOR condition in the Boolean expression.

In accordance with at least some embodiments of the present invention a group authentication method is provided that generally comprises:

detecting the presence of a first credential in proximity to a reader;

determining that group authentication is required to make an access control decision; and invoking a group authentication process that includes:
exchanging data between the reader and the first credential;
obtaining a first value based on the exchange of data between the reader and the first credential;
exchanging data between the reader and a second credential;
obtaining a second value based on the exchange of data between the reader and the second credential;
analyzing a group authentication rule with the first and second values; and
making a group authentication decision based on the analysis step.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary access control system. Although well suited for use with, e.g., a system using computers, servers, and other computing devices, the invention is not limited to use with any particular type of computing or communication device or configuration of system elements. Those skilled in the art will recognize that the disclosed techniques may be used in any application in which it is desirable to perform group authentication processes.

The exemplary systems and methods of this invention will also be described in relation to analysis software, modules, and associated analysis hardware. However, to avoid unnecessarily obscuring the present invention, the following description omits well-known structures, components and devices that may be shown in block diagram form that are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1B:
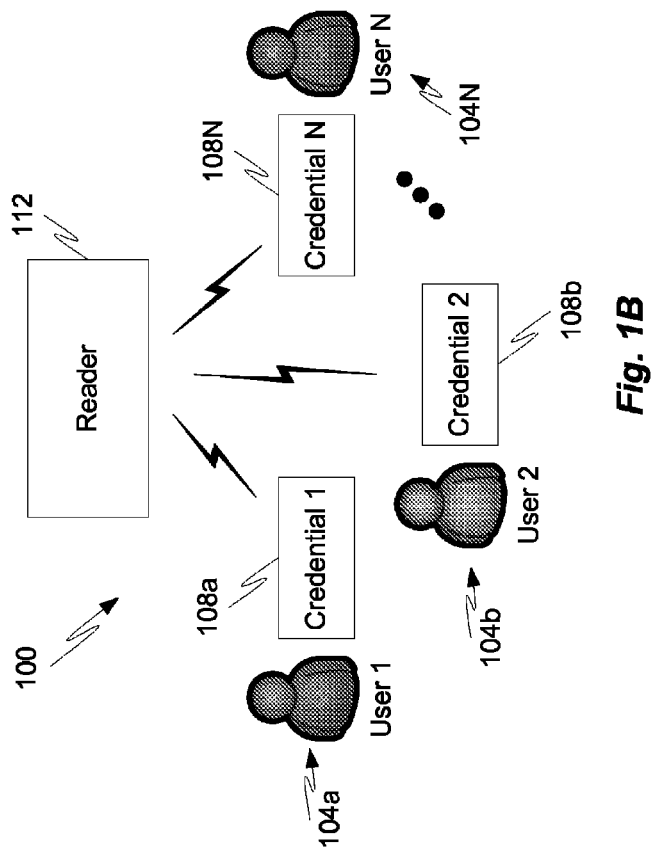
FIG. 1B depicts a second communication system configuration in accordance with embodiments of the present invention.
Figure 1A:
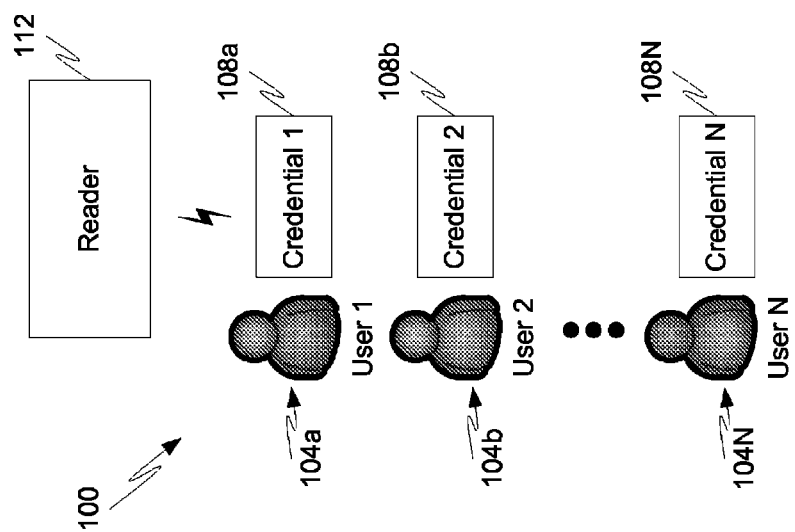
FIG. 1A depicts a first communication system configuration in accordance with embodiments of the present invention.

Referring initially to FIGS. 1A and 1B, details of a secure access system 100 are depicted in accordance with at least some embodiments of the present invention. The secure access system 100 generally comprises a plurality of readers 104a-N, each having one or more credentials 108a-N. The credentials 108a-N may correspond to any type of portable access credential such as a Radio Frequency Identification (RFID) card (e.g., operating at 13.56 MHz and/or 125 kHz), an Integrated Circuit (IC) card, a smart card, a key fob, a passport, a credit card, a debit cart, a PDA, a tag, a Near Field Communications (NFC) enabled mobile communication device, and the like. A credential 108 is a device that carries evidence of authority, status, rights, and/or entitlement to privileges for a holder or user 104 of the credential 108. As such, a credential 108 is a portable device that is used to complete transactions with a reader 112. One particular example of a credential 108 is an RFID smartcard that has data stored thereon allowing a holder 104 of the credential 108 to access an asset protected by a reader 112.

As used herein, the terms a "holder" and a "user" are used interchangeably in reference to an individual 104 carrying or an object associated with credential 108.

One function of a reader 112 is to control access to certain assets. More specifically, a reader 112 may be positioned at an access point for a given asset (e.g., a door for a room, building, or safe, a computer for electronic files, and so on). Unless a proper credential 108 or group of credentials is presented to the reader 112, the access point is maintained in a secure state such that admittance or access to the asset is denied. If a credential 108 or group of credentials having authority to access the asset is presented to the reader 112, then the reader 112 has the discretion to allow the user of the credential 108 or group of credentials access to the asset and implement various actions accordingly. In some embodiments, the access control decision may be made at the reader 112. In some embodiment, the access control decision may be made at one of the credentials 108 and a signal is communicated back to the reader 112 indicating results of the decision, at which point the reader 112 simply invokes an action or set of actions consistent with the decision.

In still other embodiments, the reader 112 may be connected to a control panel through a communication network and the control panel may be responsible for making certain access control decisions on behalf of the reader 112. In such a configuration, the control panel may be connected to a database comprising a list of access permissions and rules. The reader 112 is used as a conduit between the control panel and the credential 108 and also implements actions consistent with access control decisions made by the control panel.

Communications between the reader 112 and a credential 108 may be contactless and/or contact-based. In particular, the reader 112 and credential(s) 108 may be equipped to communicate via RF signals, in which case contactless communications are possible. In other embodiments, the reader 112 may comprise some sort of contact-based communication interface and the credential 108 has to be swiped, inserted, or otherwise contacted with the reader 112.

In some embodiments, the reader 112 may be adapted to facilitate group authentication decisions. In such embodiments, it becomes necessary to present multiple credentials 108a-N (where N is greater than or equal to two) to the reader 112 before an access control decision is made.

As can be seen in FIG. 1A, it may be the situation that each of the credentials 108a-N needs to be presented to the reader 112 in a sequential fashion. In this scenario, the reader 112 reads data from each of the credentials 108a-N one at a time and either waits until all credentials 108a-N have been read before making an access control decision or attempts to make an access control decision after each of the credentials 108a-N has been presented thereto. The sequential reading of credentials 108a-N may be necessitated by the fact that the credentials 108a-N and reader 112 utilize a contact-based communication mechanism and it is physically impossible for the reader 112 to read more than one credential 108 at a time. Contactless communication mechanisms may also be utilized in the sequential reading scenario.

As can be seen in FIG. 1B, an alternative scenario allows the reader 112 to read data from a plurality of credentials 108a-N at substantially the same time. This usually requires the use of contactless communication protocols, although the reader 112 may be provided with multiple reading interfaces in which case contact-based communication mechanisms may also be used. In particular, if the reader 112 only has a single wireless communication interface, then the processor of the reader 112 has to be capable of processing multiple communications simultaneously, thereby enabling simultaneous communications with all credentials 108a-N that are within a reader range of the reader 112. Otherwise, the reader 112 may be equipped with multiple interfaces of either the same or different types that each can be used to communicate with a different credential 108. In such a configuration, the reader 112 may comprise separate processors for each interface or a single processor within the reader 112 is capable of processing multiple communications from multiple interfaces of different types at substantially the same time.

In some group authentication situations, a Boolean expression controlling group access to an asset controlled by the reader 112 may require that certain different types of credentials 108a-N are presented to the reader 112. For example the Boolean expression may provide, at least in part, that credential type-A AND credential type-B are presented to the reader 112 before a group is allowed access to an asset protected by the reader 112. Credential type-A may correspond to an RFID or similar type of credential 108 utilizing wireless communication mechanisms and credential type-B may correspond to a contact-based credential. Alternatively, the different types of credentials may correspond to two different wireless credentials operating at different frequencies. U.S. patent application Ser. Nos. 11/470,660 and 11/562,314, the entire contents of which are hereby incorporated herein by reference, provide examples of multi-technology readers 112 that may be equipped with two or more interfaces or interface types.

Figure 2:
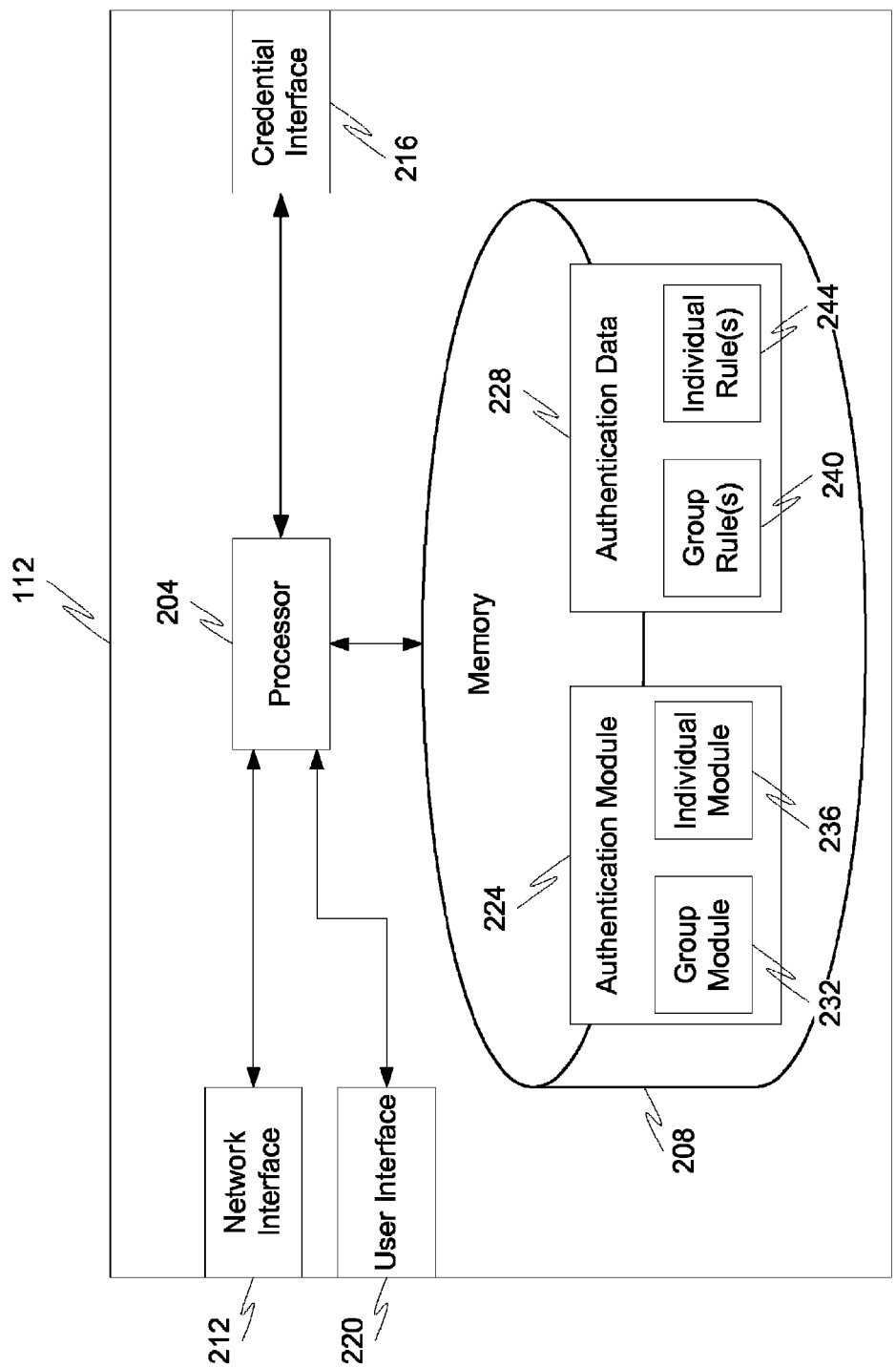
FIG. 2 is a block diagram depicting details of a reader in accordance with embodiments of the present invention.

Referring now to FIG. 2, further details of a reader 112 will be described in accordance with at least some embodiments of the present invention. The reader 112 may comprise a processor 204, memory 208, a network interface 212, a credential interface 216, and a user interface 220.

The processor 204 is provided to execute instructions contained within memory 208. As such, the functionality of the reader 112 is typically stored in memory 208 in the form of instructions and carried out by the processor 204 executing such instructions. Accordingly, the processor 204 may be implemented as any suitable type of microprocessor or similar type of processing chip. One example of the processor 204 may include any general-purpose programmable processor, digital signal processor (DSP) or controller for executing application programming contained within memory 208. Alternatively, or in addition, the processor 204 and memory 208 may be replaced or augmented with an application specific integrated circuit (ASIC), a programmable logic device (PLD), or a field programmable gate array (FPGA).

The memory 208 generally comprises software routines facilitating, in operation, pre-determined functionality of the reader 112. The memory 208 may be implemented using various types of electronic memory generally including at least one array of non-volatile memory cells (e.g., Erasable Programmable Read Only Memory (EPROM) cells or FLASH memory cells, etc.) The memory 208 may also include at least one array of dynamic random access memory (DRAM) cells. The content of the DRAM cells may be pre-programmed and write-protected thereafter, whereas other portions of the memory may selectively be modified or erased. The memory 208 may be used for either permanent data storage or temporary data storage.

In some embodiments, the memory 208 comprises an authentication module 224 and authentication data 228. The authentication module 224 is provided to enable the reader 112 to perform authentication processes. Within the authentication module 224 are a group module 232 and an individual module 236. The group module 232 may be the specific module responsible for executing a group authentication or authorization process whereas the individual module 236 may be the specific module responsible for executing an individual authentication or authorization process. Accordingly, the reader 112 may be adapted to make an access control decision for a single credential 108 based on the data contained thereon or the reader 112 may be adapted to make an access control decision for a group of credentials 108a-N based on the collective data stored on the group of credentials 108a-N. In some embodiments, the authentication module 224 may comprise the ability to determine whether the group module 232 or individual module 236 should be invoked, depending upon the type or specific identity of a particular credential 108 presented to the reader 112. In some embodiments, the authentication module 224 may invoke both the group module 232 and individual module 236 every time and if either module confirms that access to a particular asset is permitted, then an affirmative access control decision is implemented.

In making an access control decision for a single credential 108, the individual module 236 may utilize individual rule(s) 244 contained within the authentication data 228. The individual rule(s) 244 may comprise decision parameters which define whether a single credential 108 is allowed access to a particular asset. In some embodiments, the individual rule(s) 244 may correspond to a list of credentials authorized to access the asset protected by the reader 112 individually. In some embodiments, the individual rule(s) 244 may comprise keys, passwords, or similar types of data that must be found in a specific single credential 108 before admitting access to a particular asset.

In making an access control decision for a group of credentials 108a-N, the group module 232 may utilize group rule(s) 240 contained within the authentication data 228. The group rule(s) 240 may comprise decision parameters which define whether a particular group of credentials 108a-N is allowed access to a particular asset. In some embodiments, the group rule(s) 240 may include one or more Boolean expressions that, when satisfied, permits a group of credential holders access to a particular asset.

The network interface 212 may comprise any type of communications port or adaptor that enables the reader 112 to communicate with other communication or computing devices, such as a control panel. The network interface 212 may be implemented as any type of suitable communications port, for example, a Small Computer Systems Interface (SCSI), an Ethernet port, a modem, a coaxial cable port, a USB port, a wireless adapter, or the like.

The credential interface 216 may comprise one or more interfaces. Contactless and/or contact-based technologies may be utilized in the credential interface 216. Exemplary types of credential interfaces 216 include, without limitation, an RFID interface comprising one or more RF antennas, a driver circuit, a modulation unit, a demodulation unit, and the like. Other exemplary credential interfaces 216 include a Wiegand interface, a mag-stripe reader, an electrical contact interface, combinations thereof, and the like.

The user interface 220 may comprise a user input and/or user output. Examples of a user input include, without limitation, a keyboard, keypad, touchpad, mouse, rollerball, and the like. The user input is generally responsible for converting motion of a user into an electronic signal that is useable within the reader 108. Examples of a user output include, without limitation, a speaker, a light, a series of lights, a Light Emitting Diode (LED) display, a Liquid Crystal Display (LCD), a plasma display, or any other component capable of rendering electronic information in a physically-accessible format. The user interface 220 may comprise a combined user input and user output, possibly in the form of a touchscreen interface or the like.

Figure 3:
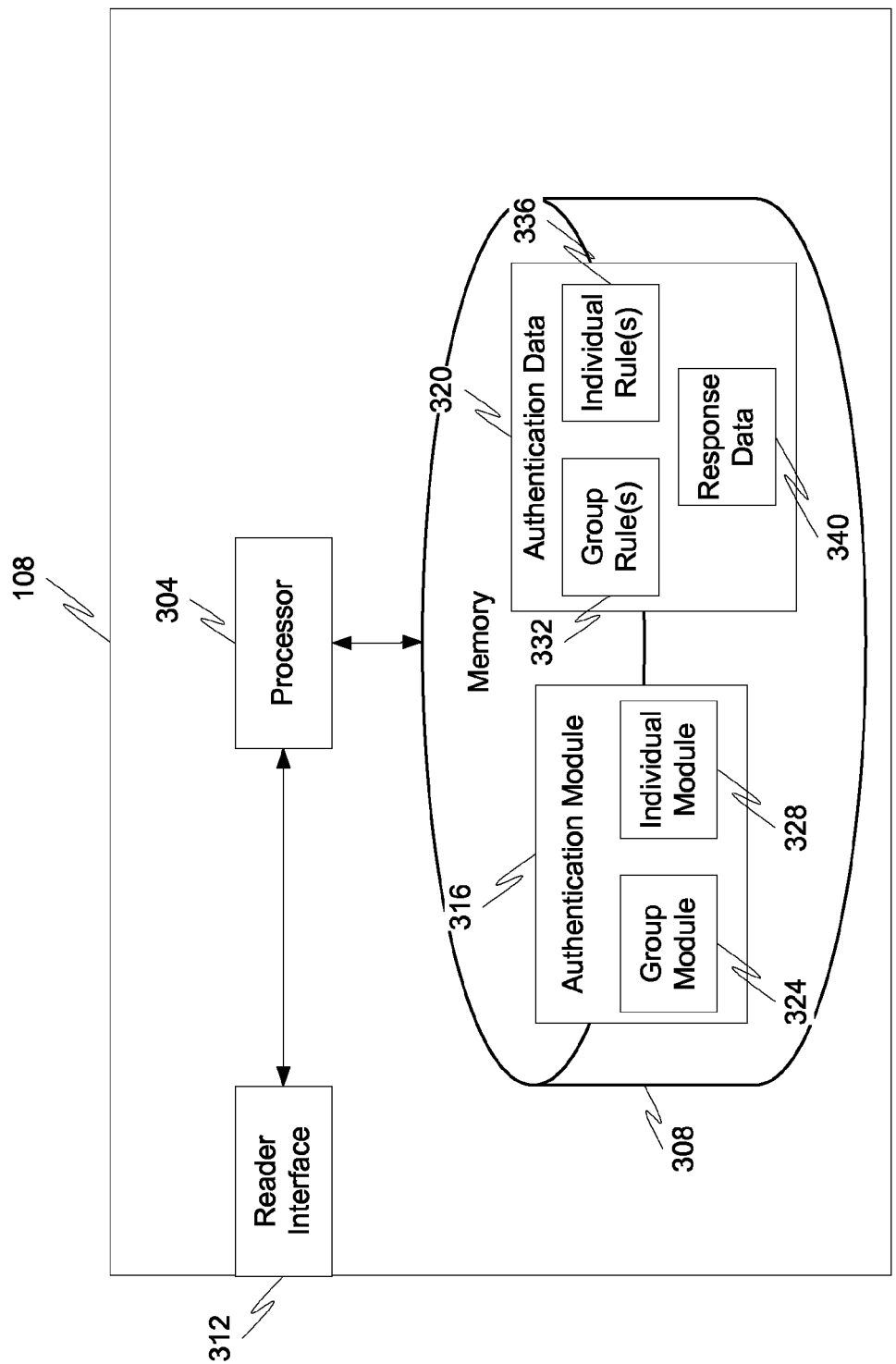
FIG. 3 is a block diagram depicting details of a credential in accordance with embodiments of the present invention.

Referring now to FIG. 3, details of an exemplary credential 108 will be described in accordance with at least some embodiments of the present invention. The credential 108 may include a processor 304, a memory 308, and a reader interface 312. Similar to processor 204, the processor 304 may also comprise a DSP, microprocessor, or the like. The information contained within memory 308 may be executed by the processor 304. In alternative configurations, the processor 304 and memory 308 may be executed as an ASIC, PLD, or FPGA.

The contents of the memory 308 may be similar to the contents of memory 208, particularly if the credential 108 is enabled to make on-card access control decisions. As such, the memory 308 may contain an authentication module 316 comprising a group module 324 and individual module 328 in addition to containing authentication data 320. The authentication data 320 may include group rule(s) 332 and individual rule(s) 336 for making group and/or individual access control decisions. In addition, the authentication data 320 includes response data 340 that is analyzed by the authentication module 316 in connection with making an access control decision. In particular, the response data 340 comprises either a data set or instructions for responding to certain challenges issued by the reader 112 that substantially uniquely identify the credential 108 among the plurality of credentials 108a-N. In some embodiments, the response data 340 includes only a portion of data that is needed to successfully satisfy a group rule(s) 332. Exemplary types of information that can be included in the response data 340 include, for example, a cryptographic algorithm, a cryptographic key, a personal identification number, a social security number, an account number, a password, a card identification number, a serial number, a site code, or the like.

Figure 4:
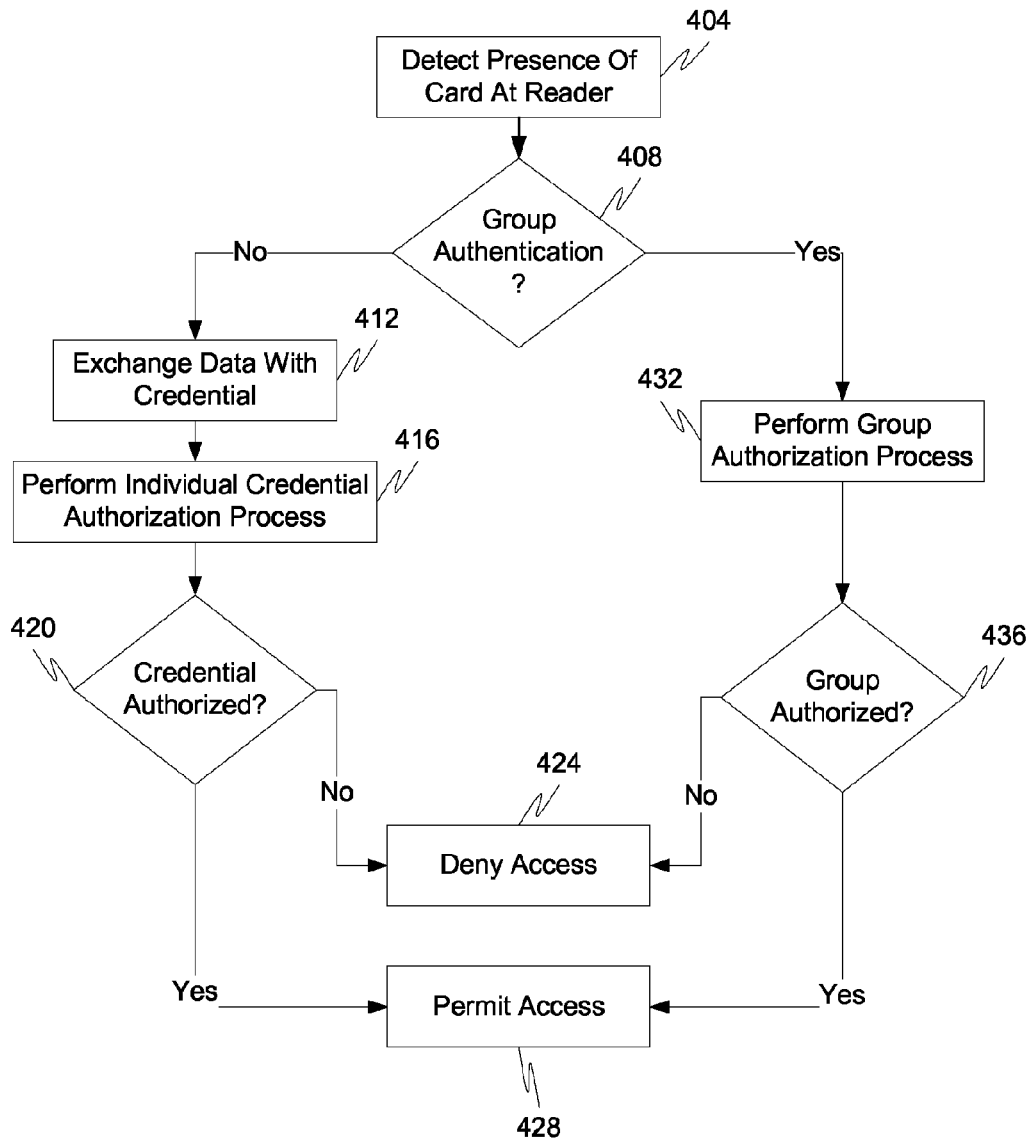
FIG. 4 is a flow chart depicting an authentication method in accordance with embodiments of the present invention.

With reference now to FIG. 4, an exemplary authentication method will be described in accordance with at least some embodiments of the present invention. The method is initiated when the presence of at least one card or credential 108 is detected by a reader (step 404). This step may be satisfied when a credential 108 is inserted, swiped, or otherwise contacted with the reader 112. This step may also be satisfied when a reader 112 detects the presence of an RF-enabled credential 108 within its read range (i.e., by detecting a change in strength of an RF field generated by an antenna of the reader 112).

Once a credential 108 is detected, the method proceeds by determining whether group authentication is to occur (step 408). Group authentication may be required when the reader 112 is only allowed to authorize groups to gain access to an asset protected by the reader 112. In other circumstances, a first amount of data may be read from the credential 108 to determine if the credential has less than the total amount of data required to complete authentication. A group authentication process may also be enforced if the reader detects the presence of two or more credentials 108 or two or more persons within proximity of the reader 112. In some embodiments, the reader 112 may be equipped with a sensor mechanism which allows the reader 112 to detect the presence of one, two, three, or more persons to determine if a group authentication process is required. For example, an infrared scanner, motion detector, distributed weight scale, or the like may be connected to the reader 112, which enables the reader to detect whether a single person is attempting to gain access to the asset or whether multiple persons are attempting to gain access to the asset. In the event that multiple persons are detected by the reader 112, then group authentication may be required. Otherwise, a traditional single-credential authentication process may be invoked.

If the query of step 408 is answered negatively, then the method proceeds with the reader 112 and credential 108 exchanging data (step 412). In some embodiments, the reader 112 may present a random number or similar type of challenge to the credential 108. The credential 108 may then receive the random number or challenge, perform a processing of such data using its response data 340, and provide a response to the reader 112. Alternatively, the reader 112 may request a certain type of data from the credential 108, in which case the credential provides a subset or all of its response data 340 to the reader 112.

The method continues by one or both of the reader 112 and credential 108 performing an individual credential process (step 416). The individual module 236 and/or 328 analyzes data exchanged between the reader 112 and credential 108 to determine whether the individual credential is allowed access to the asset protected by the reader 112 (step 420). In some embodiments, the access control decision can be made entirely at the reader 112. In some embodiments, the access control decision can be made entirely at the credential 108. In some embodiments, both the reader 112 and credential 108 contribute to the access control decision. In some embodiments, part or all of the access control decision can be made at a control panel in communication with the reader 112.

If the individual credential is authorized to access the asset protected by the reader 112, then the reader 112 permits the credential 108 and its holder 104 access to the asset (step 428). Otherwise, access is denied (step 424). In situations where the access control decision is made at the credential 108, the credential 108 sends a message to the reader 112 informing the reader 112 of the decision and the reader 112 permits or denies access in accordance with the message received from the credential 108.

Referring back to step 408, if group authentication is required, then the method continues by invoking one or both of the group modules 232, 324 to perform a group authentication process (step 432). Details of this process will be discussed in more detail with respect to FIG. 5.

Depending upon the decision generated by the group authentication process, it is determined whether or not the group is allowed access to the protected asset (step 436). If the query is answered affirmatively, then the reader 112 permits access (step 428). Otherwise, the reader 112 denies the group access to the asset (step 424).

Figure 5:
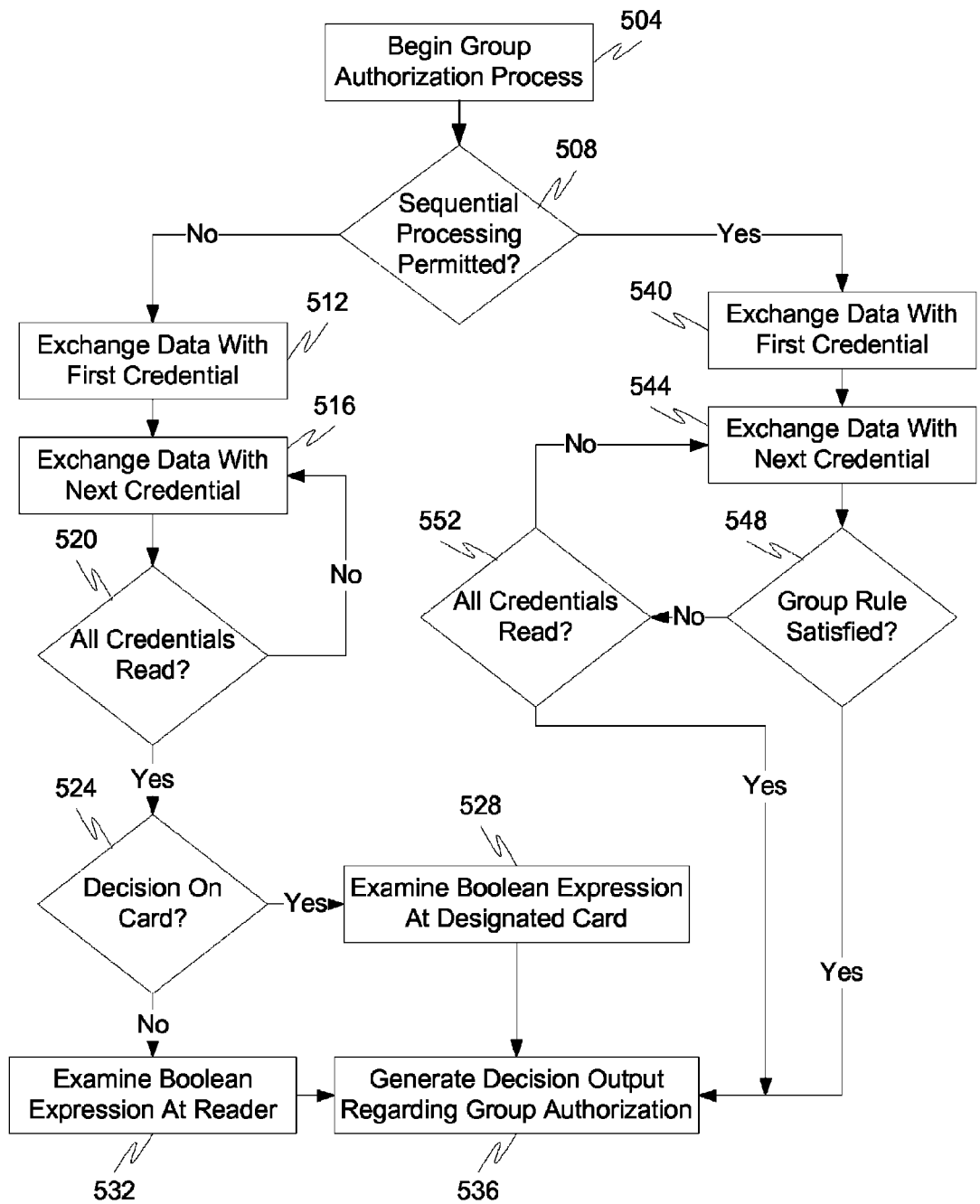
FIG. 5 is a flow chart depicting details of a group authorization process executed in accordance with embodiments of the present invention.

With reference now to FIG. 5, additional details of a group authentication process will be described in accordance with at least some embodiments of the present invention. The group authentication process is initiated (step 504) and continues with the group module 232 and/or 324 determining whether sequential processing is permitted (step 508). Sequential processing may be permitted in circumstances where the group rule(s) 240, 332 do not contain either a NOT or XOR operator. Such conditions usually require that all detected credentials 108 and/or users 104 be analyzed before a complete and accurate group authentication decision can be made.

In the event that sequential processing is not permitted, the method proceeds with the exchange of data between the reader 112 and the first credential 108a (step 512). Usually in group authentication situations, the reader 112 provides a random number to the credential 108 to which the credential 108 responds with a value obtained based on the processing of the random number. The value received from the first credential 108a represents the portion of data representing the first credential 108a in the Boolean expression (i.e., credential or user A). Thereafter, the method continues with the exchange of data between the reader 112 and the next credential 108 (e.g., the second credential 108b) (step 516). During this data exchange, the reader 112 receives another value from the next credential 108.

The method continues by determining whether all of the credential 108a-N have been read (step 520). If not, the method returns to step 516. If so, the method proceeds by determining whether the group access decision will be made on the reader 112 or on the card 108 (step 524). The location where such a group access decision is made depends upon whether the reader 112 or a credential 108 comprises the group module functionality. In some embodiments, a stand-alone reader, such as a non-networked reader not having a network interface 212, may transfer the group access decision to the credential 108. Another situation where the credential 108 can be used to make the group access decision includes a situation where a smart card or NFC enabled phone is being utilized as the credential 108. These types of credential 108 usually have a sufficient amount of processing power to support making a group access control decision.

In the event that the decision is to be made on a credential 108, then the reader 112 transfers all of the values collected from the various credentials 108a-N in the group to credential 108 which makes the access control decision based on its analysis of the group rules 332 (step 528). In some embodiments, this involves the evaluation of a Boolean expression, which may be simple or complex, based on the values obtained from each of the credentials 108a-N. An output of the group authentication process is then generated and provided as an input to the decision made at step 436 (step 536).

The credential 108 chosen by the reader 112 to make the access control decision may be selected on the basis that the credential 108 is a designated decision-making credential. In other embodiments, however, the reader 112 may randomly select a credential 108 to make the group access decision. Use of a randomly selected credential 108 may be useful for providing an additional layer of security which requires that any randomly selected credential in the group have the ability to make a decision on card. If that randomly selected credential is unable to perform the decision-on-card functions, then the group may be denied access even though it would have otherwise obtained access based on the values provided to the reader 112.

If the reader 112, or a control panel connected to the reader 112, is responsible for making the group access decision, then the group rules 240 are analyzed at the reader 112 (or control panel) to determine whether the group is permitted access to the protected asset (step 532). In some embodiments, this involves the evaluation of a Boolean expression, which may be simple or complex, based on the values obtained from each of the credentials 108a-N. The reader 112 then generates a decision output regarding the group authentication process (step 536)

Referring back to step 508, if sequential processing is permitted, then the method proceeds with the exchange of data between the first credential 108a and the reader 112 (step 540). During the exchange the reader 112 obtains a first value from the first credential 108a, which identifies the first credential 108a or the holder thereof 104a to the reader 112. The method continues with the exchange of data between the reader 112 and the next credential 108 (step 544). In this step, the first value obtained from the first credential 108a may be provided to the next credential 108 along with a new random number for processing by the next credential 108. The next credential 108 can process the new random number and obtain its own value (i.e., a second value). The next credential 108 can then analyze the group rule(s) 332, if available, based on the first value and the second value to determine if the group rule(s) 332 have been satisfied (step 548). Alternatively, the next credential 108 may only process the new random number and provide the second value back to the reader 112 which analyzes the group rule(s) 240 based on the first value and the second value to determine if the group rule(s) 240 have been satisfied (step 548). Regardless of whether the reader 112 or credential 108 performs this analysis, the analysis may involve the examination of a Boolean expression based on the first and second values.

If the group rule(s) 240, 332 have not yet been satisfied, then the method proceeds by determining if all of the credentials have been read (step 552). If not, then the method returns to step 544 where a next credential 108 (i.e., third credential) exchanges data with the reader 112. Again, either the third credential or the reader 112 can take responsibility for determining whether the group is permitted access to the protected asset.

The process of steps 544, 548, and 552 continue until either the group rule(s) 332 are satisfied or until all credentials have been read.

Thereafter, the method continues with the generation of a decision output at either a credential 108 or reader 112(step 536).

The utilization of sequential processing in making a group access decision is useful for a couple of reasons. First, an affirmative access decision can be made immediately upon satisfaction of the group rule(s) 240, 332, instead of waiting for every credential 108 to exchange data with the reader 112. This can save a significant amount of time when contact-based communications between the reader 112 and credentials 108a-N are required. Second of all, a third-party observer and the group themselves may not be able to immediately ascertain the exact conditions necessary (i.e., the precise group rule(s) 240, 332) to obtain group access because it is possible that some of the credentials presented to the reader 112 did not, in fact, contribute to the satisfaction of the group rule(s) 240, 332. This provides an additional layer of security over traditional pin-and-tumbler group authentication techniques.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as TPM, PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an integrated circuit card applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for authenticating groups of credentials. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method comprising:
    detecting the presence of a group of credentials comprising at least one of a first credential and a second credential in proximity to a reader, wherein at least one of the first and second credentials are a portable device;
    determining that group authentication is required to make an access control decision;
    invoking a group authentication process at a selected one of the first and second credentials that includes:
    determining if sequential processing is allowed;
    obtaining a first value based on an exchange of data between the reader and the first credential;
    obtaining a second value based on an exchange of data between the reader and the second credential;
    analyzing a group authentication rule with the first and second values; and making a group authentication decision based on the analysis step;
wherein in response to determining that sequential processing is allowed, group access is permitted in the absence of exchanging data between the reader and at least one credential in the group of credentials;
wherein in response to determining that sequential processing is not allowed, group access is conditioned upon each credential in the group of credentials exchanging data with the reader;
implementing an action consistent with the group authentication decision, wherein the action is one of admitting access to an asset protected by the reader, denying access to the asset protected by the reader, communicating an indication to the reader admitting access to an asset protected by the reader, and communicating an indication to the reader denying access to the asset protected by the reader.

2. The method of claim 1, wherein sequential processing is allowed in the group authentication process when the group authentication rule does not contain one or both of a NOT and XOR operation.

3. The method of claim 1, wherein the group authentication rule comprises a Boolean expression and at least one Boolean operation.

4. The method of claim 1, wherein the first credential performs the group authentication process because it is one of a designated credential and a randomly selected credential.

5. The method of claim 1, wherein the second credential performs the group authentication process.

6. The method of claim 1, wherein determining that group authentication is required involves determining that one or more of the following conditions exist:
   a plurality of credentials are detected within proximity of the reader;
   a plurality of users are detected within proximity of the reader; and
   access to an asset protected by the reader is only allowed upon satisfaction of a group rule.

7. An access control system, comprising:
   memory including instructions in the form of machine-readable code, the instructions including an authentication module and authentication data;
   a processor, configured to execute the instructions stored in the memory; and
   wherein the authentication module is configured to detect the presence of a group of credentials comprising at least one of a first credential and a second credential in proximity to a reader, determine that group authentication is required to make an access control decision, and invoke a group authentication process at a selected one of the first and second credentials that includes:
      determining if sequential processing is allowed;
      obtaining a first value based on an exchange of data between the reader and the first credential;
      obtaining a second value based on an exchange of data between the reader and the second credential;
      analyzing a group authentication rule contained within the authentication data with the first and second values; and
      making a group authentication decision based on the analysis step;
   wherein in response to determining that sequential processing is allowed, group access is permitted in the absence of exchanging data between the reader and at least one credential in the group of credentials;
   wherein in response to determining that sequential processing is not allowed, group access is conditioned upon each credential in the group of credentials exchanging data with the reader;
   wherein the authentication module is configured to communicate an indication of an access control decision to the reader, the access control decision consistent with the group authentication decision and is one of admitting access to an asset protected by the reader and denying access to the asset protected by the reader.

8. The system of claim 7, wherein sequential processing is allowed in the group authentication process when the group authentication rule does not contain one or both of a NOT and XOR operation. and condition group access upon each credential in the group of credentials exchanging data with the reader.

9. The system of claim 7, wherein the group authentication rule comprises a Boolean expression and at least one Boolean operation.

10. The system of claim 7, wherein the authentication module is configured to determine that group authentication is required by determining that one or more of the following conditions exist:
    a plurality of credentials are detected within proximity of the reader;
    a plurality of users are detected within proximity of the reader; and
    access to an asset protected by the reader is only allowed upon satisfaction of a group rule.

11. The method of claim 1, wherein the first credential performs the group authentication process.

12. The method of claim 1, wherein the second credential performs the group authentication process.

13. The system of claim 7, wherein the first credential performs the group authentication process because it is one of a designated credential and a randomly selected credential.

14. The system of claim 7, wherein the first credential performs the group authentication process.

15. The system of claim 7, wherein the second credential performs the group authentication process.

* * * * *